US008069311B2

United States Patent
Sun

(10) Patent No.: US 8,069,311 B2
(45) Date of Patent: Nov. 29, 2011

(54) METHODS FOR PREFETCHING DATA IN A MEMORY STORAGE STRUCTURE

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 11/966,389

(22) Filed: Dec. 28, 2007

(65) Prior Publication Data

US 2009/0172293 A1 Jul. 2, 2009

(51) Int. Cl.
G06F 12/00 (2006.01)
(52) U.S. Cl. .................. 711/137; 711/213; 711/217
(58) Field of Classification Search .............. 710/8–19, 710/104; 711/124, 137, 204, 213, 217; 713/1–2, 713/100; 707/716, 721, 796–797; 712/207, 712/237
See application file for complete search history.

(56) References Cited

U.S. PATENT DOCUMENTS

| 7,143,264 B2 * | 11/2006 | Debes et al. ............... 711/217 |
| 2004/0133747 A1 * | 7/2004 | Coldewey .................. 711/137 |
| 2009/0113137 A1 * | 4/2009 | Grayson et al. ............ 711/136 |

OTHER PUBLICATIONS

Dependence based prefetching for linked data structures, Roth et al., Nov. 1998, ACM SIGPLAN Notices, vol. 33, Issue 11, pp. 115-126.*
Jerome M. Shapiro, Embedded Image Coding Using Zerotrees of Wavelet Coefficients, Dec. 1993, IEEE Transactions on Signal Processing, vol. 41, No. 12, pp. 3445-3462.*
"Bytecode," Wikipedia, the free encyclopedia, Jan. 23, 2009, 3 pages.
"Instruction Prefetch," Wikipedia, the free encyclopedia, Jan. 9, 2009, 1 page.
"Java Virtual Machine," Wikipedia, the free encyclopedia, Jan. 25, 2009, 6 pages.
"Locality of Reference", Wikipedia, the free encyclopedia, Jan. 9, 2009, 5 pages.
"Prefetcher," Wikipedia, the free encyclopedia, Dec. 15, 2008, 3 pages.
"Prefetch Input Queue," Wikipedia, the free encyclopedia, Jan. 1, 2009, 3 pages.
"Red-Black Tree," Wikipedia, the free encyclopedia, Nov. 2, 2007, 14 pages.
"Row-Major Order," Wikipedia, the free encyclopedia, Nov. 14, 2008, 3 pages.

* cited by examiner

*Primary Examiner* — Brian Peugh
*Assistant Examiner* — Nicholas Simonetti
(74) *Attorney, Agent, or Firm* — Trop, Pruner & Hu, P. C.

(57) ABSTRACT

A method includes detecting a cache miss. The method further includes, in response to detecting the cache miss, traversing a plurality of linked memory nodes in a memory storage structure being used to store data to determine if the memory storage structure is a binary tree. The method further includes, in response to determining that the memory storage structure is a binary tree, prefetching data from the memory storage structure. An associated machine readable medium is also disclosed.

17 Claims, 4 Drawing Sheets

METHODS FOR PREFETCHING DATA IN A MEMORY STORAGE STRUCTURE

BACKGROUND

A data structure, or memory storage structure, is a way of storing data in a computer so that it may be accessed efficiently. The choice of the data structure often begins from the choice of an abstract data type. A well-designed data structure allows a variety of critical operations to be performed, using as few resources, both execution time and memory space, as possible. Data structures are implemented using the data types, references, and operations on them provided by a programming language.

Different types of data structures are suited to different kinds of applications, and some are highly specialized to certain tasks. For example, binary trees may be used in implementations of in-memory databases. A binary tree is a tree data structure in which each node has at most two children. Typically the child nodes are called left and right.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
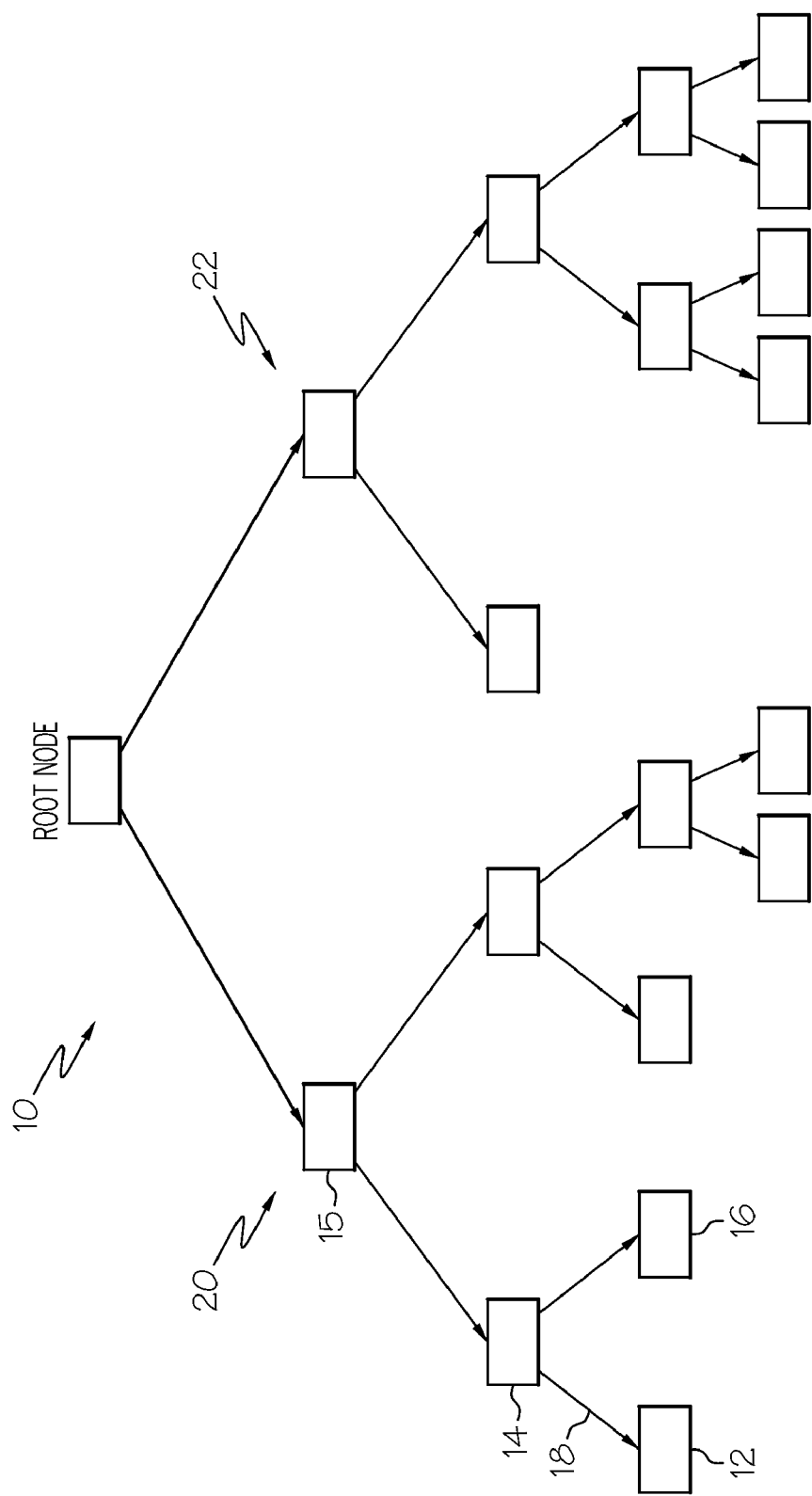
FIG. 1 shows an embodiment of a binary tree memory structure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

During memory accessing of a memory device during transfer of data from memory to a memory cache, cache misses may occur. In order to avoid cache misses, various techniques, such as prefetching, may be implemented. Prefetching may be used in temporal-based memory allocation, such as binary trees. FIG. 1 shows an embodiment of a binary tree memory storage structure 10, which may be implemented through various programming languages. In one embodiment, the binary tree 10 may be used as a Java Treemap.

In one embodiment, the binary tree 10 shown in FIG. 1 includes a plurality of linked memory nodes such as node 12. Each node may include up to two linked child nodes. For example, node 14 may be considered the "parent" node to nodes 12 and 16, which are both considered "child nodes" of node 14. Thus, nodes of 12 and 16 are considered sibling nodes to one another. Nodes in the binary tree 10 may contain data, as well as pointers, which point to the memory location where the child nodes reside. These pointers are illustrated as arrows in FIG. 1, such as pointer 18.

In one embodiment, the binary tree 10 includes a left subtree 20 and a right subtree 22. Each node in the binary tree 10 may store both a data value and a key value. The data value may be the actual data being stored in the binary tree, while the key value may be a value used for ordering of the nodes in the binary tree 10. In one embodiment, memory is allocated in the binary tree 10 such that nodes farther left in the binary tree 20 will have key values less than those to the right. For example, the key value of node 12 may be less than that of the nodes 14, 16 and the key value of node 14 may be less than that of the node 16. Furthermore, key values of nodes of the left subtree 20 may all be less in value than the key values stored in nodes in the right subtree 22. Thus, in this embodiment, each left child node may have a key value that is the value of less than the key value of its sibling (right child) node. However, it should be appreciated that the binary tree 10 may be arranged such that the nodes farther right in the binary tree 10 may have key values less than those farther left in the binary tree 10.

As previously described, in one embodiment the binary tree 10 may be used as a memory storage structure. In one embodiment, prefetching may be implemented to retrieve data from the binary tree 10 to place into a memory cache. As previously discussed, the binary tree 10 may be configured so that key values of each node increase in value from left to right across the binary tree 10. Thus, prefetching can be based upon this particular configuration. For example, data may be stored in each node of the binary tree 10. In one embodiment, the order of the data in the binary tree 10 may be temporally-based such that nodes closer in key-value are more temporally proximate than nodes farther apart in key value. Thus, when a data value of a left child node is accessed, it may be predicted that a data value of the right child will be accessed soon thereafter due to being temporally proximate to the left child node as indicated by the key values. Thus, the right child may be prefetched in anticipation of being accessed, or loaded.

Figure 2:
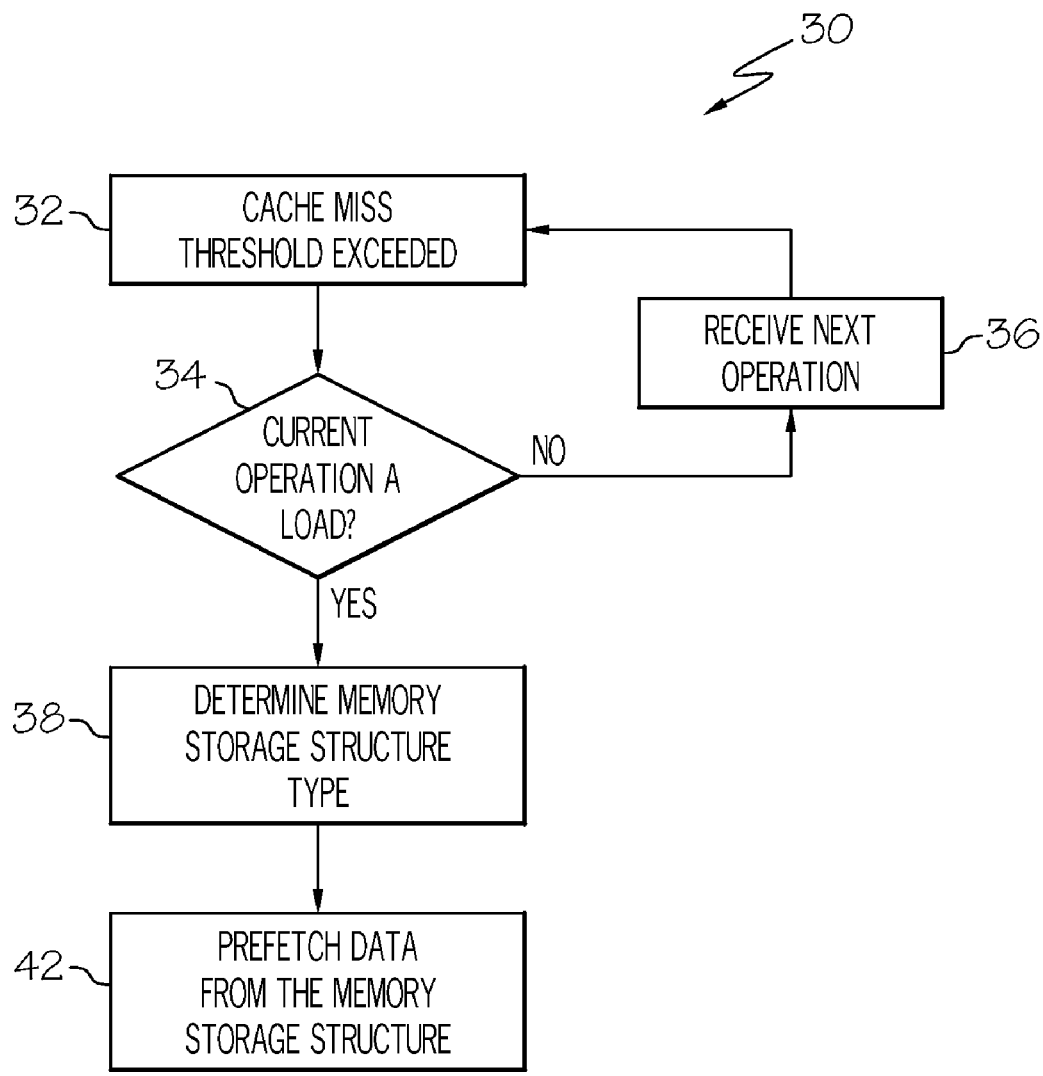
FIG. 2 shows an embodiment of a flowchart of a data prefetching routine.

In one embodiment, a routine may be executed that first establishes that a memory storage structure being accessed is a binary tree, and if so, a sibling node of a node being accessed may be prefetched. Referring now to FIG. 2, a flowchart 30 illustrates a routine for prefetching data from a memory storage structure, such as a binary tree. At block 32, a cache miss threshold is exceeded, which may indicate that prefetching is to be implemented. In one embodiment, the routine may be called using hardware LLC cache miss measurements through peformance counters. At block 34 a determination is made as to if a current operation is a load, which requires the data be retrieved from a node, such as node 12 of the binary tree 10. If the operation is not a load operation, the next operation may be received at block 36. If the current operation is a load operation, at block 38 a memory storage structure containing the node being accessed may be evaluated to determine the type of memory storage structure in which the node is contained. In one embodiment, this may be done through a pattern recognition routine, such as that described in regard to FIG. 3. Once the memory storage structure type is determined, data may be prefetched from the memory storage structure, as indicated at block 42. In one embodiment, a binary tree may have data in a right child node prefetched if a sibling node is being accessed, since it may be assumed that the right child node is temporally proximate to the sibling node and will be accessed sooner than other nodes in the binary tree 10.

Figure 3:
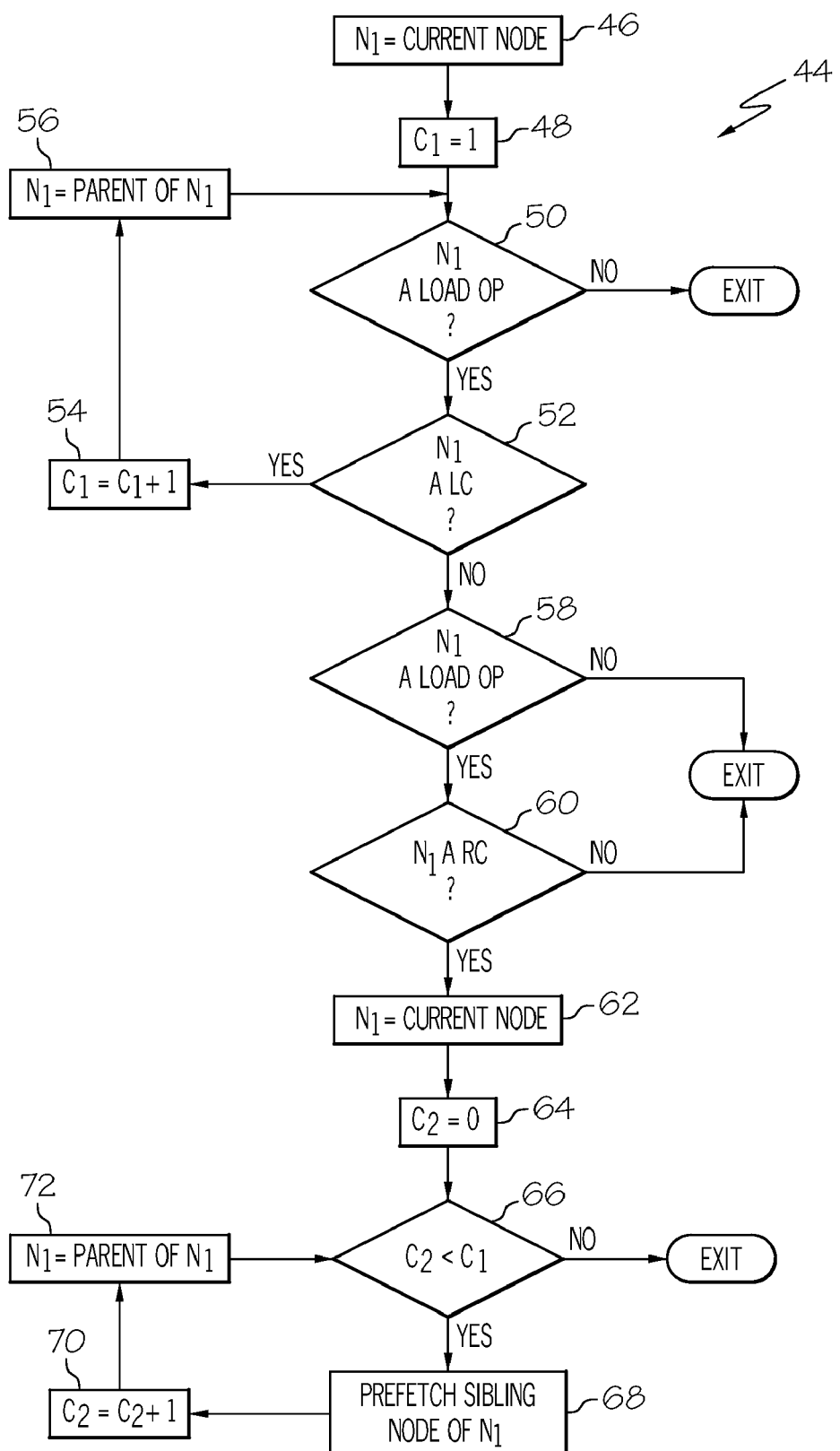
FIG. 3 shows an embodiment of a flowchart of a pattern recognition routine.

Referring now to FIG. 3, a flowchart 44 is shown, which illustrates a routine that may be used to determine a type of memory storage structure such as that performed at block 38 of FIG. 2, as well as prefetch data from sibling nodes of a nodes being accessed in a binary tree. At block 46, a current node being accessed in a memory storage structure may be set to a variable $N_1$. At block 48 a counter may be set to 1. At block 50 a determination may be made as to if variable $N_1$ is a load operation. If $N_1$ is not a load the routine may be exited. If $N_1$ is determined to be a load operation at the block 50, a determination may be made as to if $N_1$ is a left child node at block 52. In one embodiment, this may be determined through evaluating a memory pointer to $N_1$.

If $N_1$ is a left child node, the counter $c_1$ may be incremented by 1 at block 54. After the increment, variable $N_1$ may be set to the parent of the current node set to $N_1$ at block 56, i.e., the node pointing to the current node being accessed. At block 58, the counter $c_1$ is also incremented by 1. This loop may continue, which allows the routine to move from child node to parent node making the determination that a node is a left child. Once a node is determined to not be a left child at block 52, a determination may be made as to if $N_1$ is a load operation at block 58. If $N_1$ is not a load operation, the program is exited. If $N_1$ is a load operation, a determination as to if $N_1$ is a right child is made at block 60. At block 62, a current node being accessed in a memory storage structure may be set to a variable $N_1$. At block 64, a counter $c_2$ is set to zero.

At block 66 a comparison as to if $c_2$ is less than $c_1$ is made. If $c_2$ is less than $c_1$ the routine is exited. If $c_2$ is not less than $c_1$, the sibling node of $N_1$ is prefetched at block 68. At block 70 the counter $c_2$ is incremented by one. At block 72, $N_1$ is set to the parent of $N_1$. This loop allows a binary tree structure to be traversed prefetching each right child. In an alternative embodiment, the prefetching may be performed for the right bottom children of a binary tree. Once $c_2$ is no longer less than $c_1$, the routine may be exited as illustrated in the flowchart 44.

The routines described in FIGS. 2 and 3 may be used for example, to prefetch right children nodes in the binary tree 10 in FIG. 2. If, for example, the initial node being accessed is node 12, the routine of the flowchart 44 may move up the subtree 20 determining each particular node is a left child node, e.g. nodes 12, 14, and 15. At the root node 17, the routine of the flowchart 44 may determine that the root node 17 is not a left child node. The flowchart 44 may then return to the node 12 and begin traversing the subtree 20 to prefetch right children. It should be appreciated that this routine may apply to prefetch left children after right children are identified. It should be further appreciated that the routine may be changed such that only sibling nodes that are leaf nodes may be prefetched.

Figure 4:
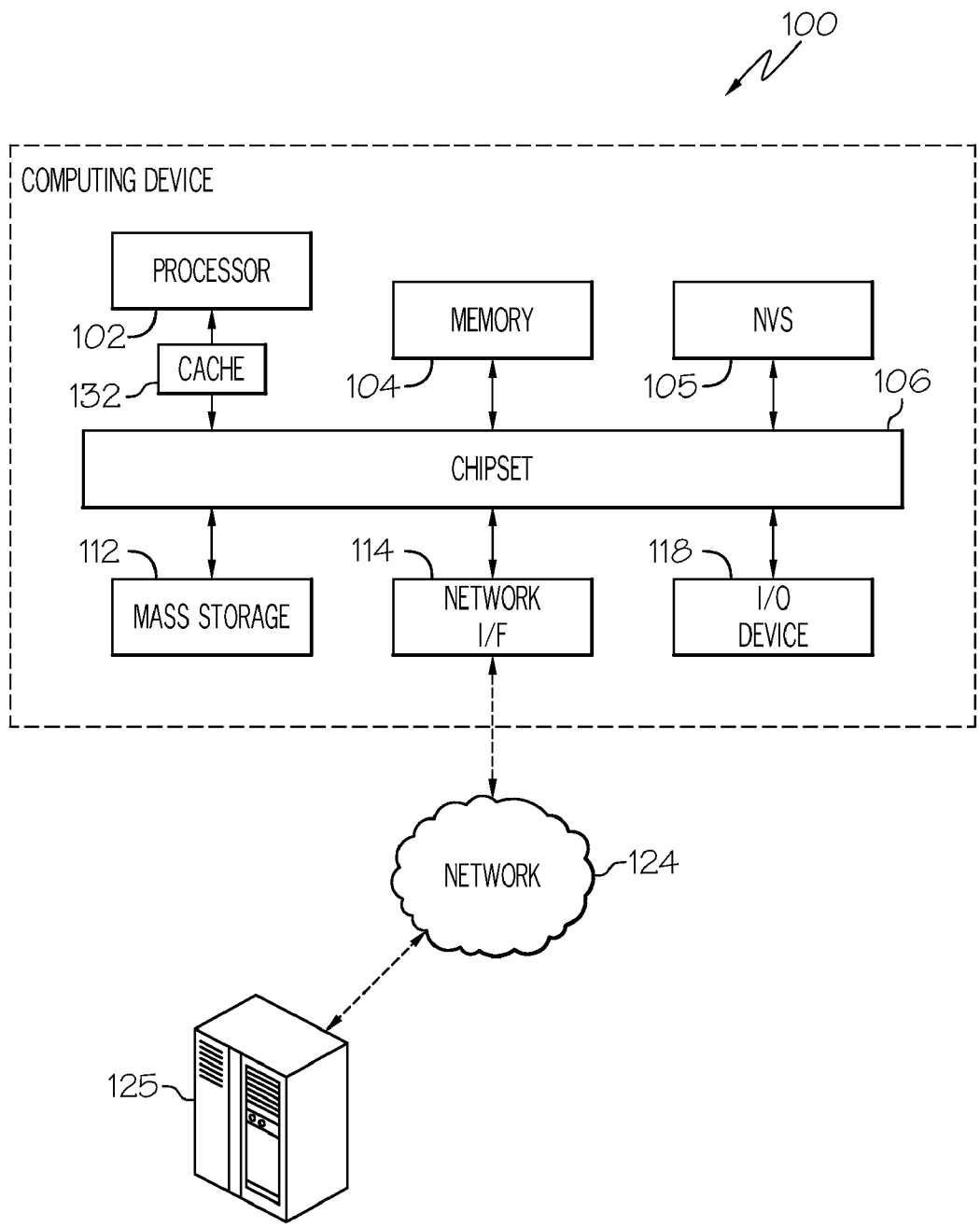
FIG. 4 shows a block diagram of an embodiment of a computing device.

Referring now to FIG. 4, one embodiment of a computing device 100 is shown that may be used to execute the routines described in regard to FIGS. 2 and 3. The computing device 100 may include a processor 102 connected to a memory cache 132 connected to a chipset 106. The computing device 100 may also include a memory 104 coupled to the chipset 106. A mass storage device 112, a non-volatile storage (NVS) device 105, a network interface (I/F) 114, and an Input/Output (I/O) device 118 may also be coupled to the chipset 106. Embodiments of computing device 100 include, but are not limited to, a desktop computer, a notebook computer, a server, a personal digital assistant, a network workstation, or the like. In one embodiment, the processor 102 may execute instructions stored in memory 104.

The processor 102 may include, but is not limited to, processors manufactured or marketed by Intel Corp., IBM Corp., and Sun Microsystems Inc. In one embodiment, computing device 100 may include multiple processors 102. The processors 102 may also include multiple processing cores. Accordingly, the computing device 100 may include multiple processing cores for executing binary code of the computing device 100.

The memory 104 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, the memory 104 may include one or more memory units that do not have to be refreshed.

The chipset 106 may include a memory controller, such as a Memory Controller Hub (MCH), an input/output controller, such as an Input/Output Controller Hub (ICH), or the like. In an alternative embodiment, a memory controller for memory 104 may reside in the same chip as processor 102. The chipset 106 may also include system clock support, power management support, audio support, graphics support, or the like. In one embodiment, chipset 106 is coupled to a board that includes sockets for processor 102 and memory 104.

The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 118 may include a keyboard, a mouse, a display, a printer, a scanner, or the like.

The computing device 100 may interface to external systems through network interface 114. The network interface 114 may include, but is not limited to, a modem, a Network Interface Card (NIC), or other interfaces for coupling a computing device to other computing devices. A carrier wave signal 123 may be received/transmitted by network interface 114. In the embodiment illustrated in FIG. 1, carrier wave signal 123 is used to interface computing device 100 with a network 124, such as a Local Area Network (LAN), a Wide Area Network (WAN), the Internet, or any combination thereof. In one embodiment, network 124 is further coupled to a computing device 125 such that computing device 100 and computing device 125 may communicate over network 124.

The computing device 100 also includes non-volatile storage 105 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

The mass storage 112 may include, but is not limited to, a magnetic disk drive, such as a hard disk drive, a magnetic tape drive, an optical disk drive, or the like. It is appreciated that instructions executable by processor 102 may reside in mass storage 112, memory 104, non-volatile storage 105, or may be transmitted or received via network interface 114. It should be further appreciated that the routines described in regard to FIGS. 2 and 3 may be implemented in regard to data transfers between the mass storage 112 and the memory 104.

In one embodiment, the computing device 100 may execute an Operating System (OS). Embodiments of an OS include Microsoft Windows®, the Apple Macintosh operating system, the Linux operating system, the Unix operating system, or the like.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   detecting a cache miss,
   in response to detecting the cache miss, traversing a plurality of linked memory nodes in a memory storage structure being used to store data to determine if the memory storage structure is a binary tree, and
   in response to determining that the memory storage structure is a binary tree, prefetching data from the memory storage structure.

2. The method of claim 1, wherein the detecting a cache miss comprises determining that a predetermined number of cache misses have occurred for a load operation.

3. The method of claim 1, wherein the prefetching data from the memory storage structure comprises prefetching data from a sibling node of at least one of the plurality of memory nodes traversed.

4. The method of claim 1, wherein the traversing a plurality of linked memory nodes in a memory storage structure to determining if the memory structure is a binary tree comprises traversing a plurality of linked memory nodes in the memory storage structure to determine if the plurality of linked memory nodes form a subtree of a binary tree.

5. A method comprising:
   detecting a cache miss,
   in response to detecting the cache miss, determining if a plurality of linked memory nodes in a memory storage structure form a binary tree, and
   in response to the determining, prefetching data from a portion of the plurality of linked memory nodes.

6. The method of claim 5, wherein the determining if a plurality of linked memory nodes in a memory storage structure form a binary tree comprises traversing the plurality of linked memory nodes to determine if the plurality of linked memory nodes form a subtree of a binary tree.

7. The method of claim 5, wherein the prefetching data from a portion of the plurality of linked memory nodes comprises prefetching data from at least one sibling node of the plurality of linked memory nodes.

8. The method of claim 5, wherein the prefetching data from a portion of the plurality of linked memory nodes comprises prefetching data from a sibling node of at least one leaf node of the plurality of linked memory nodes.

9. A machine readable medium comprising a plurality of instructions, that in response to being executed, result in a computing device
   detecting a data transfer miss from a memory device,
   in response to detecting the data transfer miss, determining a type of memory storage structure being used to store data, wherein the memory storage structure is evaluated to determine whether the structure is a binary tree structure, and
   in response to determining the type of memory storage structure, prefetching data from the memory storage structure.

10. The machine readable medium of claim 9, wherein the plurality of instructions further result in a computing device determining that a predetermined number of data transfer misses have occurred for a load operation.

11. The machine readable medium of claim 9, wherein the plurality of instructions further result in a computing device traversing a plurality of linked memory nodes in the memory storage structure to determine the type of memory storage structure.

12. The machine readable medium of claim 9, wherein the plurality of instructions further result in a computing device traversing a plurality of linked memory nodes in the memory storage structure to determine if the memory storage structure is a binary tree.

13. The machine readable medium of claim 12, wherein the plurality of instructions further result in a computing device prefetching data from a sibling node of at least one of the plurality of memory nodes traversed.

14. The machine readable medium of claim 9, wherein the plurality of instructions further result in a computing device traversing a plurality of linked memory nodes in the memory storage structure to determine if the plurality of linked memory nodes form a subtree of a binary tree.

15. The method as recited in claim 1, wherein the determining that the memory storage structure is a binary tree further comprises evaluating the memory storage structure using pattern recognition.

16. The method as recited in claim 5, wherein the determining if a plurality of linked memory nodes in a memory storage structure form a binary tree further comprises evaluating the memory storage structure using pattern recognition.

17. The medium as recited in claim 9, wherein the evaluation to determine whether the structure is a binary tree structure further comprises instructions to evaluate the memory storage structure using pattern recognition.

* * * * *